May 21, 1957 C. J. MALHIOT 2,792,922
ARTICLE FEEDING DEVICE
Filed Aug. 29, 1952 2 Sheets-Sheet 1
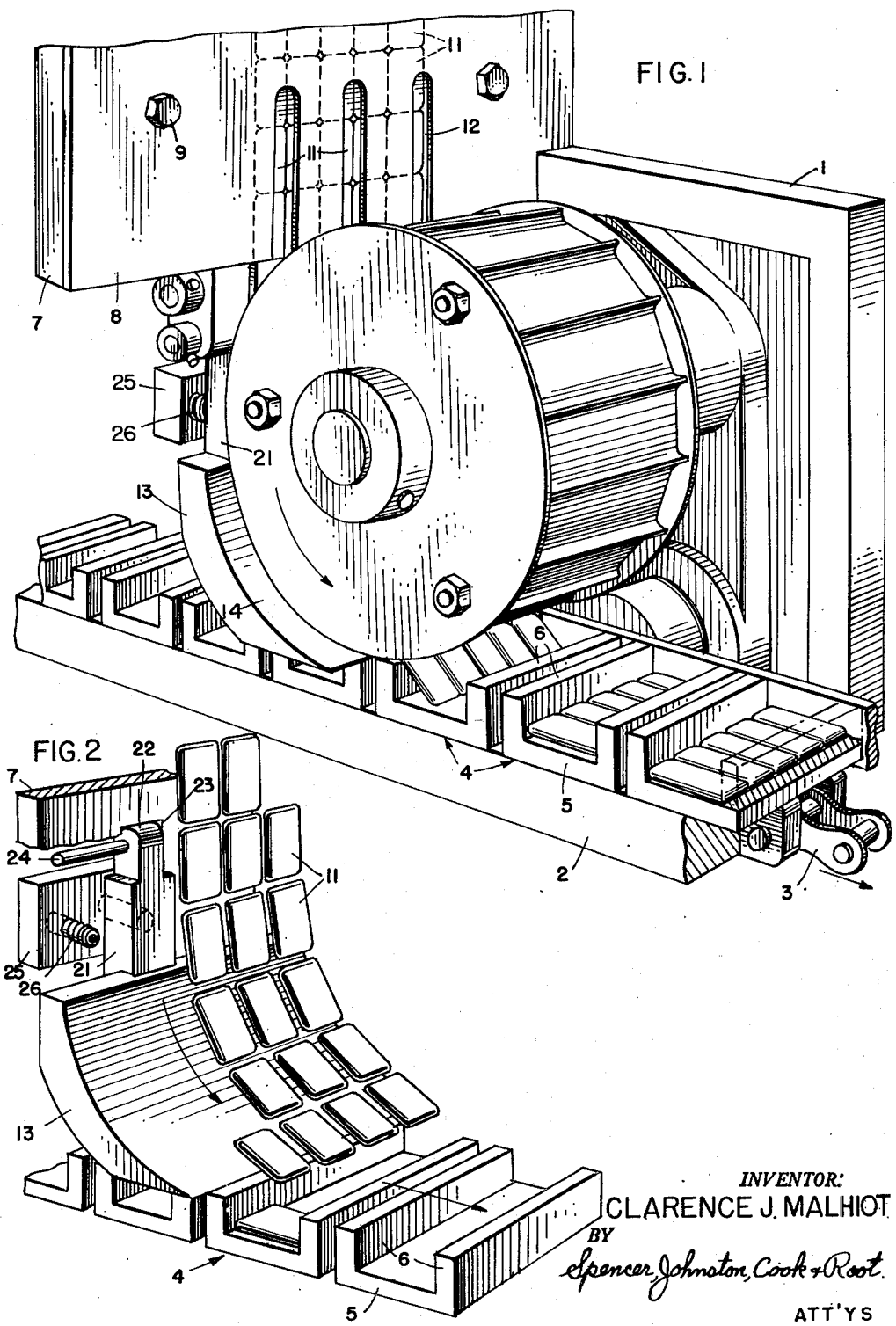
INVENTOR:
CLARENCE J. MALHIOT
BY
Spencer Johnston, Cook & Root.
ATT'YS May 21, 1957
C. J. MALHIOT
2,792,922
ARTICLE FEEDING DEVICE
Filed Aug. 29, 1952
2 Sheets-Sheet 2
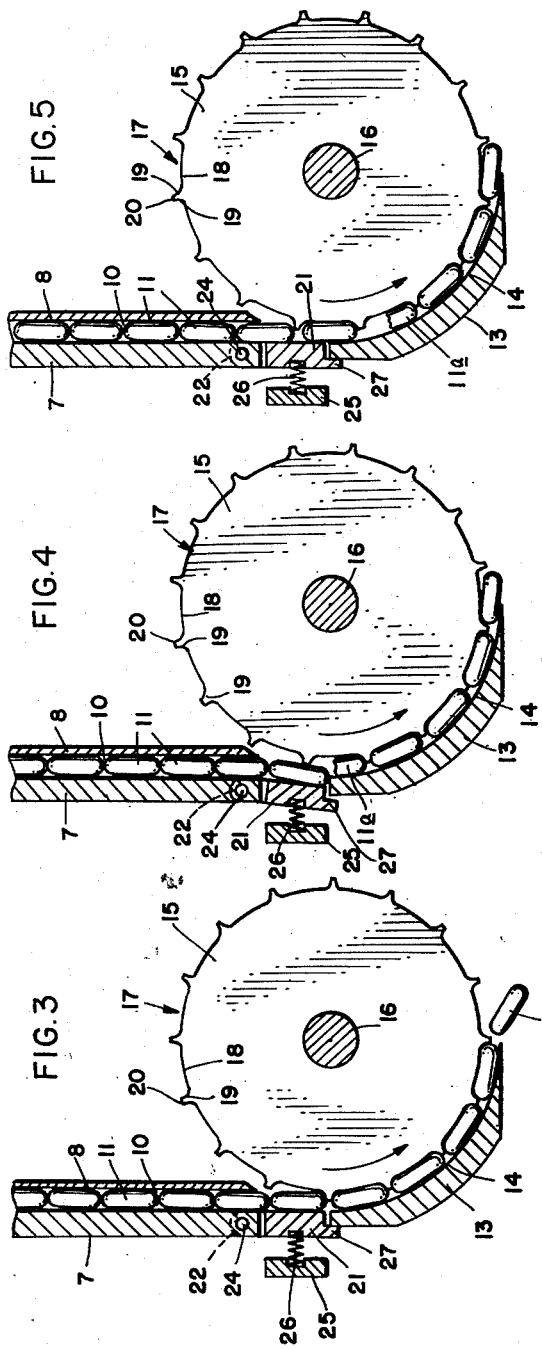
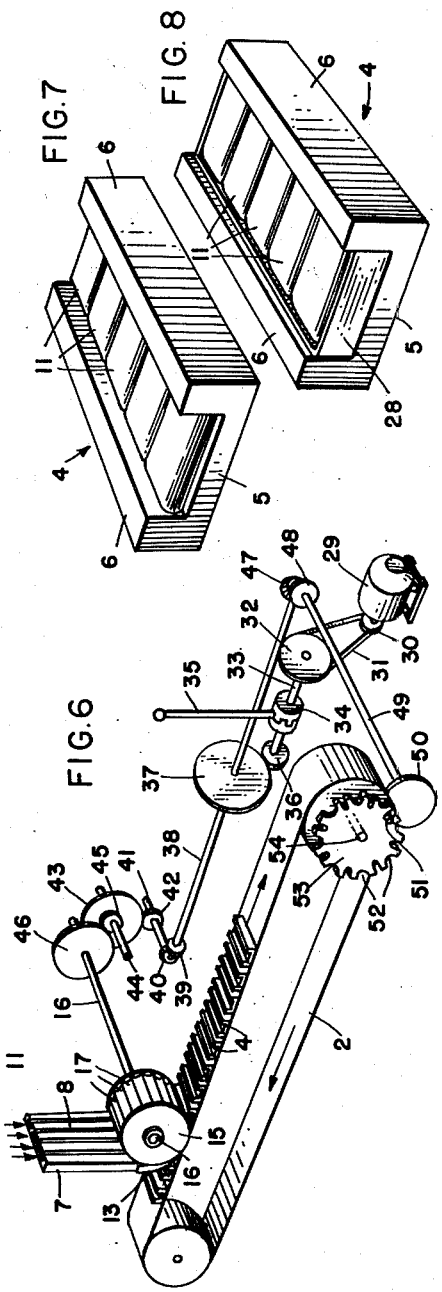
INVENTOR:
CLARENCE J. MALHIOT
BY
Spencer, Johnston, Cook & Root
ATT'YS United States Patent Office 2,792,922
Patented May 21, 1957

2,792,922

ARTICLE FEEDING DEVICE

Clarence J. Malhiot, Chicago, Ill., assignor to F. B. Redington Co., Chicago, Ill., a corporation of Delaware Application August 29, 1952, Serial No. 307,072

2 Claims. (Cl. 198—26)

This invention relates in general to article feeding devices wherein articles are fed from a magazine or chute to a transfer device which deposits the articles onto a horizontally disposed conveyor. More particularly, the invention is concerned with the feeding of articles to a conveyor for packaging wherein the article has characteristics which render it capable of becoming broken or mutilated.

Although the device embodying the invention has been shown herein for purposes of illustration as applied to the feeding and packaging of gum which has been coated and which has the familiar pillow shape, it will be obvious that the invention may be applied equally as well for the feeding and packaging of other types of articles.

Coated gum of the character and type herein referred to is customarily packaged in small carboard boxes in groups generally in alignment with each other. Obvious modifications may be made in the invention as disclosed herein to make the device suitable for use in feeding and packaging various numbers, sizes, and shapes of articles such as coated gum, depending upon the size and shape of the package in which the gum is to be finally retailed.

Heretofore in packaging articles of the nature of candy coated gum, the process has been relatively slow due to the lack of a satisfactory device for feeding the gum into the package. The present invention is designed to overcome the disadvantages heretofore present in machines of this character and it is therefore a principal object of the present invention to provide an article feeding device wherein the articles are initially positoned to be fed continuously by gravity.

Another object of the invention is to provide an article feeding device wherein articles fed continuously by gravity from the open lower end of a chute are transferred from the chute and deposited in buckets provided on a horizontally moving conveyor.

A further object of the invention is to provide an article feeding device wherein a rotatable transfer means has pockets therein to receive the lowermost article of a stack of articles which is fed thereto by gravity from a chute and wherein the continuously rotating transfer means will deposit the article so received into the bucket of a horizontally moving conveyor.

Still another object of the invention is to provide a gum feeding device wherein the individual pieces of coated gum are fed by gravity through the open lower end of a chute into the pockets of a rotary transfer mechanism which has thereon separating ribs between adjacent pockets for the purpose of cogging in with the falling speed of the gum pieces and transferring the pieces to a horizontal conveyor thereby obtaining extremely high speeds in the packaging of the gum.

A still further object of the invention is to provide a suitable mechanism which will permit continuous and proper operation of an article feeding device wherein the articles are fed continuously by gravity even though broken or half pieces may find their way into the chute.

A still further and more specific object of the invention is to provide a coated gum feeding device wherein gum pieces are fed continuously by gravity through the open bottom of the chute to individual pockets of a rotatable transfer device and wherein yieldable means are provided to delay the dropping downwardly of a gum piece immediately after a broken or half piece has been deposited into a pocket thereby to maintain the device in proper operation thereafter and to realign succeeding gum pieces with the pockets in the transfer device.

Other objects and advantages of the invention will become apparent upon reading the following description taken in conjunction with the accompanying drawings in which:

Fig. 1 is a perspective view illustrating the relationship between the transfer means for transferring the articles from the vertical chute to the horizontal conveyor;

Fig. 2 is a fragmentary perspective view similar to Fig. 1 but with the transfer mechanism removed therefrom more clearly to illustrate the passage of the articles from the chute onto the conveyor;

Fig. 3 is a fragmentary vertical sectional view through the chute illustrating the normal operation of the device when uniform and whole gum pieces are being transferred;

Fig. 4 is a view similar to Fig. 3 but illustrating the operation of the yieldable finger when a partial or half piece has been deposited onto the transfer means;

Fig. 5 is a view similar to Fig. 4 showing the transfer apparatus after it has resumed normal operation and after the passage of a partial or half piece through the feed chute;

Fig. 6 is a somewhat diagrammatic perspective view illustrating one form of drive means for operating the conveyor and transfer means in timed relation;

Fig. 7 is a perspective view of one of the buckets located on the conveyor with gum pieces positioned therein; and Fig. 8 is a view similar to Fig. 7 but showing the gum pieces deposited into a tray located in the bucket.

In the embodiment of the invention shown in the drawings for purposes of illustration, there are disclosed articles in the form of pillow shaped coated gum pieces. Also, in the particular embodiment shown, these gum pieces are illustrated as being fed 5 pieces at a time into a bucket on the conveyor or into a tray located within the bucket for subsequent packaging. At the outset it will be obvious that this number may be varied as desired and the shape and size of the article to be fed may also be altered without in any way departing from the spirit of the invention.

Briefly described, the invention contemplates the use of a substantially vertical chute which is adapted to receive and guide the articles to the transfer means. This chute must be positioned at such an angle with respect to the horizontal that the articles therein will be stacked in superposed relation and will drop by gravity therethrough to be fed downwardly from the open lower end of the chute. The greatest speed in feeding the articles will, of course, be obtained when the chute is in a vertical position although other positions may be utilized provided they are such that the articles will drop downwardly by the force of gravity.

Rotatable transfer means are provided in any suitable form and preferably in the form of a transfer wheel as shown which has located on the surface thereof a plurality of circumferentially spaced pockets. When several of the objects are to be packaged in side-by-side relation, the chute may be made sufficiently wide to accommodate the desired number of articles and the pockets in the transfer wheel will then extend across the surface thereof in an axial direction. The pockets are separated by means of radially extending ribs and since the pockets are of a circumferential width substantially equal to the length of the article received thereby, the transfer wheel is positioned closely adjacent the open bottom of the chute so that these dividing ribs may cog in with the falling articles thereby insuring that only one article from each stack will be deposited in a pocket.

As the transfer wheel rotates, means are provided to retain the articles in the pockets until they reach a position immediately above one of the buckets on the horizontal conveyor at which time the articles will drop into the bucket or into a tray supported by the bucket and be carried to a location where subsequent operations may be performed thereon incident to the completion of the packaging process.

Referring now more particularly to the drawings, there has been illustrated a portion of a machine frame indicated by the numeral 1. The frame may take any desired form which is customary in the field of feeding and packaging machines. A horizontal table 2 is mounted on the frame for supporting the upper run of the conveyor. The conveyor itself may take any one of a number of desired forms although in the present instance the conveyor has been illustrated as comprising a chain 3 of the usual form which has fixed thereto a plurality of buckets generally indicated by the numeral 4. The size and shape of the buckets will, of course, depend upon the size and shape of the article to be dispensed. In this instance each bucket comprises a bottom 5 and spaced upwardly extending side members 6.

The chute which feeds the articles to the transfer device is preferably constructed so that it will confine the articles therein in stacked or superposed relation and may include a rear retaining wall 7 to which a cover plate 8 is secured by any suitable means such as by the bolts 9. Suitably located between the retaining wall 7 and the cover plate 8 there is a space as shown at 10 in Figs. 3, 4, and 5 which is of sufficient depth to accommodate a single vertical row of the articles 11 which in this case happens to be a pillow shaped coated gum piece.

The width of the space 10 will depend upon the width of the gum pieces 11 or other article, as well as upon the number of these articles which it is desired to be deposited in side-by-side relation into the buckets 4. For purposes of illustration there is shown herein 5 such articles in side-by-side relation so that the space 10 within the chute is sufficiently wide to accommodate 5 of the gum pieces side-by-side. If desired, suitable partitions may be located in the space 10 to guide the pieces into a number of vertical chutes each of which accommodates a single stack of the articles.

Also, if desired, a plurality of slots 12 may be located in the cover plate 8 in order that access may be had to the articles if they should become jammed in the chute.

The manner and method of depositing the articles 11 into the space 10 of the chute is immaterial and forms no part of the present invention. The placing of the articles in the chute may be done by hand, or preferably by means of a hopper (not shown) positioned at the top of the chute whereby the articles may be fed continuously into the open upper end thereof.

An arcuate retaining member 13 having an inner arcuate surface 14 thereon is positioned immediately below the chute so that the upper end thereof will be in substantial alignment with the lower end of the retaining wall 7. The arcuate surface 14 of the retaining member 13 curves downwardly and forwardly through an arc of substantially 90 degrees so that it will receive the articles in a substantially vertical position and transfer them to a substantially horizontal position. This insures the articles being in proper position for depositing into the buckets of the conveyor.

While the transfer means may also assume any desired form, it has been illustrated herein as comprising a drum or wheel 15 keyed or otherwise drivingly connected to a rotatable shaft 16. The outer peripheral surface of the wheel 15 is provided with a plurality of axially extending pockets 17 each of which has a substantially flat bottom 18 with opposite upwardly curved sides 19 whereby the sides 19 of adjacent pockets will merge together and form axially extending ribs 20.

The pockets 17 are shown as thus constructed herein because of the shape of the articles illustrated as being fed from the chute. Since the articles 11 are pillow shaped and have rounded ends, the curved portions 19 of each pocket are shaped to accommodate these curved ends of the articles. It is also to be noted that the circumferential distance between the ribs 20 is substantially equal to the length of each article 11. Furthermore, it is preferable that the depth of each pocket 17 be substantially half of the thickness of each article.

The transfer mechanism 15 is located closely adjacent the open bottom of the chute so that as the wheel rotates one of the ribs 20 will move in below the lowermost article in the stack and the next succeeding rib 20 will thereupon move between the preceding article and the next succeeding article as the wheel continues to rotate. Thus, a cogging action takes place whereby the ribs 20 will cog in with the falling articles and the wheel may be rotated as rapidly as the articles will fall under the force of gravity. This operation is clearly illustrated in Fig. 3.

The arcuate retaining member 13 has the center of curvature of its inner face 14 coincident with the center of curvature of the periphery of the wheel 15 whereby the respective articles will be retained within the pockets until the lower end of the retaining member 13 is reached at which time the articles are in a substantially horizontal position and will drop downwardly into a bucket onto the conveyor which is immediately therebelow.

Since the articles are fed by gravity in a continuous manner, there will be no time delay occurring and the articles will be fed as rapidly as the force of gravity causes them to fall. The transfer wheel 15 may therefore be operated at a greatly increased rate of speed and will deposit the articles onto the conveyor as fast as they will fall by gravity.

In dealing with gum pieces, particularly which are formed and coated by machine, it occasionally happens that a piece will become broken thus making it shorter than its companion pieces. It will be obvious from viewing Figs. 3 and 4 that if this should occur, it throws the entire stack of articles out of register with respect to the pockets and ribs on the wheel 15. When a broken or half piece reaches one of the ribs 20, the next succeeding piece which is in contact with the upper end thereof will be contacted at substantially its center or some other location between its ends by the next succeeding rib as the transfer wheel is rotated. In the case of gum, this would cause a crushing of the article, and, in cases of other types of articles, it may cause breakage or jamming of the machine.

To overcome this difficulty, the present invention also contemplates the use of a yieldable gate or finger 21 for each stack of articles 11. This yieldable member 21 is located immediately below the retaining wall 7 and between this wall and the upper end of the retaining member 13. It is preferable that the upper end of each member 21 be made slightly narrower than the remaining portion thereof as shown at 22 to be received within a recess 23 extending upwardly from the lower edge of the retaining wall 7. A pivot pin 24 passes horizontally through each of the recesses 23 as well as the upper end 22 of each member 21 whereby each member is supported for a pivotal or swinging movement.

A bar 25 is located immediately behind the members or fingers 21 and may be suitably supported on the frame of the machine. This bar 25 is spaced rearwardly of the fingers 21 and supports a plurality of yieldable members such as the springs 26. The specific form of the spring is a detail which may be changed as desired, it being shown herein as a coiled spring merely for purposes of illustration. When such a coiled spring 26 is used, the ends thereof may be received in suitable recesses in the bar 25 and the finger 21 immediately in front thereof so that pressure against the forward face of the finger will cause it to pivot about the rod or pin 24 against pressure of the spring 26. When the pressure on the finger is released the spring will return it to its normal position where the forward face thereof is substantially vertical and in the same plane as the rear face of the space 10 in the chute. Each finger 21 is provided at its lower end with an extension 27 adapted to abut the rear face of the arcuate retaining member 13 thereby to limit the forward movement of the finger.

The operation of the feeding device when a broken or half piece finds its way into the chute is illustrated in Figs. 4 and 5. The broken or half piece in these figures is indicated by the numeral 11a and is shown in Fig. 4 as resting upon one of the ribs 20. At this point, all of the pieces above the half piece 11a will be out of register with respect to the ribs 20 and pockets 17 if they were permitted to continue in this fashion. To obviate this, the pressure of the next succeeding rib 20 against the piece immediately above the half piece indicated at 11a will cause a yielding of the finger 21 whereupon the lower end of said next succeeding whole piece will come to rest against the upper end of the arcuate retaining member 13. The wheel 15, however, will continue to rotate until the next rib 20 has moved downwardly a sufficient distance to permit the spring 26 to urge the finger 21 and the adjacent piece 11 forwardly into the next succeeding pocket 17. The stack of articles may then continue to fall by gravity and each will be received in succeeding pockets in the normal and usual manner of operation as shown in Fig. 5.

It will then happen that one of the buckets in the conveyor will receive a plurality of whole pieces as well as the one broken piece although inspectors at the machine may remove the piece and replace it by the whole one or may remove the tray 28 entirely.

This spring finger is also useful when a line or stack of articles becomes jammed for any reason whereby the articles will not be crushed, but will be taken up by the next succeeding pocket.

Any suitable means may be utilized for driving the transfer wheel and the conveyor. The transfer wheel may be driven continuously as fast as the articles will drop by gravity and the conveyor may be moved either continuously or intermittently, as desired. In either event, the timing of the transfer wheel and conveyor must be synchronized so that one of the buckets on the conveyor will be immediately below and slightly beyond the lower end of the retaining member 13 at the time one or more articles are released therefrom. For purposes of illustration, a diagrammatic showing of a drive mechanism appears in Fig. 6 where the conveyor is caused to move intermittently. The entire apparatus may be driven from the single motor 29 having a pulley 30 on the shaft thereof connected by means of a belt 31 to a pulley 32 on shaft 33. A suitable clutch 34 may be mounted on shaft 33 to be manually or otherwise operable by means such as a lever 35 to engage or disengage the motor 29 from the machine.

The opposite end of shaft 33 may have a gear 36 thereon in mesh with another gear 37 mounted on shaft 38. The shaft 38 is suitably connected to both the transfer wheel and the conveyor. To accomplish the drive of the transfer wheel a bevel gear 39 may be located at one end of shaft 38 in mesh with another bevel gear 40 on shaft 41. This shaft 41 also has mounted thereon a gear 42 in mesh with gear 43 on shaft 44. This latter shaft 44 also has a gear 45 mounted thereon in mesh with gear 46 mounted on shaft 16 which is the same shaft on which the transfer wheel 15 is located. Thus, when the clutch 44 is in engagement, motor 29 will drive the transfer wheel 15 at a suitable rate of speed.

The opposite end of shaft 38 has mounted thereon a bevel gear 47 meshing with another bevel gear 48 on shaft 49. The opposite end of shaft 49 drives the conveyor intermittently by means of a Geneva movement which includes a disc 50 having a pin 51 thereon adapted to be received in successive peripheral recesses 52 on a disc 53. The disc 53 is keyed to a shaft 54 also supporting a drum around which a belt or other form of conveyor may pass to be driven thereby.

Thus, in the embodiment shown, the transfer wheel 15 will be rotated continuously while the conveyor will be moved intermittently to receive articles transferred to it by the transfer wheel from the chute as the articles are fed through the open bottom thereof by gravity.

Among the many advantages arising out of the feed mechanism embodying the present invention is the fact that the feeding of the articles is done continuously by gravity and there is no necessity for feeding the articles at any particular time. The positioning of the transfer wheel is such that the articles are in line ready to be deposited in the pockets of the wheel at any time these pockets present themselves at the proper place. The provision of the spring held or yieldable finger for each stack of articles will prevent the articles from becoming crushed and permit proper articles to be taken up by succeeding pockets without causing the stack to become jammed. Since the articles are always present, they may be fed continuously because the dividing ribs between the pockets of the transfer wheel are shaped to cog in between adjacent articles thereby greatly increasing the rate of speed at which time articles can be fed and deposited onto the conveyor.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. Article feeding, transferring and conveying mechanism comprising a plurality of relatively vertically positioned adjacently spaced chutes arranged in side-by-side relation, each chute containing a plurality of articles arranged in end-to-end contacting relation, the discharge ends of said chutes terminating angularly forwardly in a straight line and arranged in the same horizontal plane, a driven cylinder-like transfer wheel arranged at one side of the chutes whereby the chutes are tangentially arranged with respect to said wheel, said wheel having spaced pockets formed in the periphery thereof, said pockets receiving articles from each chute simultaneously in spaced apart horizontal and lateral alignment from the discharge end of each chute, a continuously operating horizontal bucket conveyer beneath the transfer wheel and having article receiving open sided buckets for receiving articles from the pockets in the wheel with each article having its inner and outer ends in alignment laterally and in the same horizontal plane, driving means to rotate said transfer wheel and to drive said horizontal conveyer simultaneously and continuously in timed relation with the wheel, and a spring pressed member interposed intermediate said chutes and adjacent said wheel to insure said articles being received in the respective pockets of said wheel.

2. An article feeding, transfer and conveying device comprising a plurality of article chutes receiving rows of articles in end-to-end contacting relation to be fed by gravity from an outlet opening at the bottom of each chute, a rotatable transfer wheel adjacent the outlet opening, longitudinal ribs spaced apart a distance substantially equal to the length of an article projecting transversely from the outer surface of the wheel and defining pockets therebetween, each of said ribs extending into the path of the lowermost article of each row to support all the articles of each row and separating the lowermost article from the next succeeding article in each row by a rib projecting between adjacent articles of each row, a moving conveyer operated in timed relation with the wheel and arranged below the wheel to receive an article of each row simultaneously, guide means between the outlet of each chute and the conveyer to transfer an article from each chute in side-by-side relation for transfer to the conveyer by the wheel, a movable element at the rear of each chute adjacent its outlet opening and forming an article supporting ledge when an article is directly engaged by a rib instead of between ribs to permit lateral movement of an article should it be out of registration with its receiving pocket of the wheel, and yieldable means to urge the movable element off the ledge and return it in a next succeeding pocket in the wheel.

References Cited in the file of this patent

UNITED STATES PATENTS

| | | |
|---|---|---|
| 334,274 | Norton | Jan. 12, 1886 |
| 870,108 | Kowastch et al. | Nov. 5, 1907 |
| 1,315,072 | Baker | Sept. 2, 1919 |
| 1,961,697 | Little | June 5, 1934 |
| 2,138,232 | Giannini | Nov. 29, 1938 |
| 2,208,474 | Carroll | July 16, 1940 |
| 2,265,576 | Peterson | Dec. 9, 1941 |
| 2,613,861 | Goerlitz | Oct. 14, 1952 |